United States Patent
Penacho et al.

(10) Patent No.: US 11,741,777 B2
(45) Date of Patent: Aug. 29, 2023

(54) STACKS OF STICKY WILD SYMBOLS

(71) Applicant: Aristocrat Technologies, Inc., Las Vegas, NV (US)

(72) Inventors: Gary Penacho, Henderson, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 17/449,593

(22) Filed: Sep. 30, 2021

(65) Prior Publication Data
US 2023/0033113 A1   Feb. 2, 2023

Related U.S. Application Data

(60) Provisional application No. 63/203,847, filed on Aug. 2, 2021.

(51) Int. Cl.
G07F 17/32 (2006.01)
G07F 17/34 (2006.01)
G06F 7/58 (2006.01)

(52) U.S. Cl.
CPC .......... *G07F 17/3213* (2013.01); *G06F 7/588* (2013.01); *G07F 17/326* (2013.01); *G07F 17/3211* (2013.01); *G07F 17/3267* (2013.01); *G07F 17/34* (2013.01)

(58) Field of Classification Search
CPC .. G07F 17/3267; G07F 17/3213; G07F 17/34; G06F 7/58
See application file for complete search history.

(56) References Cited

U.S. PATENT DOCUMENTS

| | | |
|---|---|---|
| 2008/0108431 A1 | 5/2008 | Cuddy |
| 2010/0029381 A1 | 2/2010 | Vancura |
| 2014/0274294 A1 | 9/2014 | Baerlocher |
| 2015/0105138 A1 | 4/2015 | Delekta |
| 2018/0130308 A1* | 5/2018 | Berman .............. G07F 17/3267 |
| 2019/0051096 A1* | 2/2019 | San ..................... G07F 17/3267 |
| 2019/0295377 A1 | 9/2019 | Suda |
| 2021/0366237 A1 | 11/2021 | Bouvier |

OTHER PUBLICATIONS

Office Action dated Sep. 22, 2022 for U.S. Appl. No. 17/449,622 (pp. 1-21).
Notice of Allowance dated Oct. 13, 2022 for U.S. Appl. No. 17/449,588 (pp. 1-22).

* cited by examiner

*Primary Examiner* — Robert T Clarke, Jr.
*Assistant Examiner* — Jeffrey K Wong
(74) *Attorney, Agent, or Firm* — Blank Rome LLP

(57) ABSTRACT

A slot game tracks a number of special symbols through multiple spins and unlocks game windows and/or stacks of sticky wild symbols based on the number of tracked special symbols meeting or exceeding a threshold value. Each stack of sticky wild symbols replaces a given reel for the remainder of the game or instance, such that that reel will no longer receive a random outcome and can no longer land special symbols as display symbols. As more special symbols are accumulated, more game windows will be unlocked and more stacks of sticky wild symbols will be placed on the game windows.

20 Claims, 11 Drawing Sheets

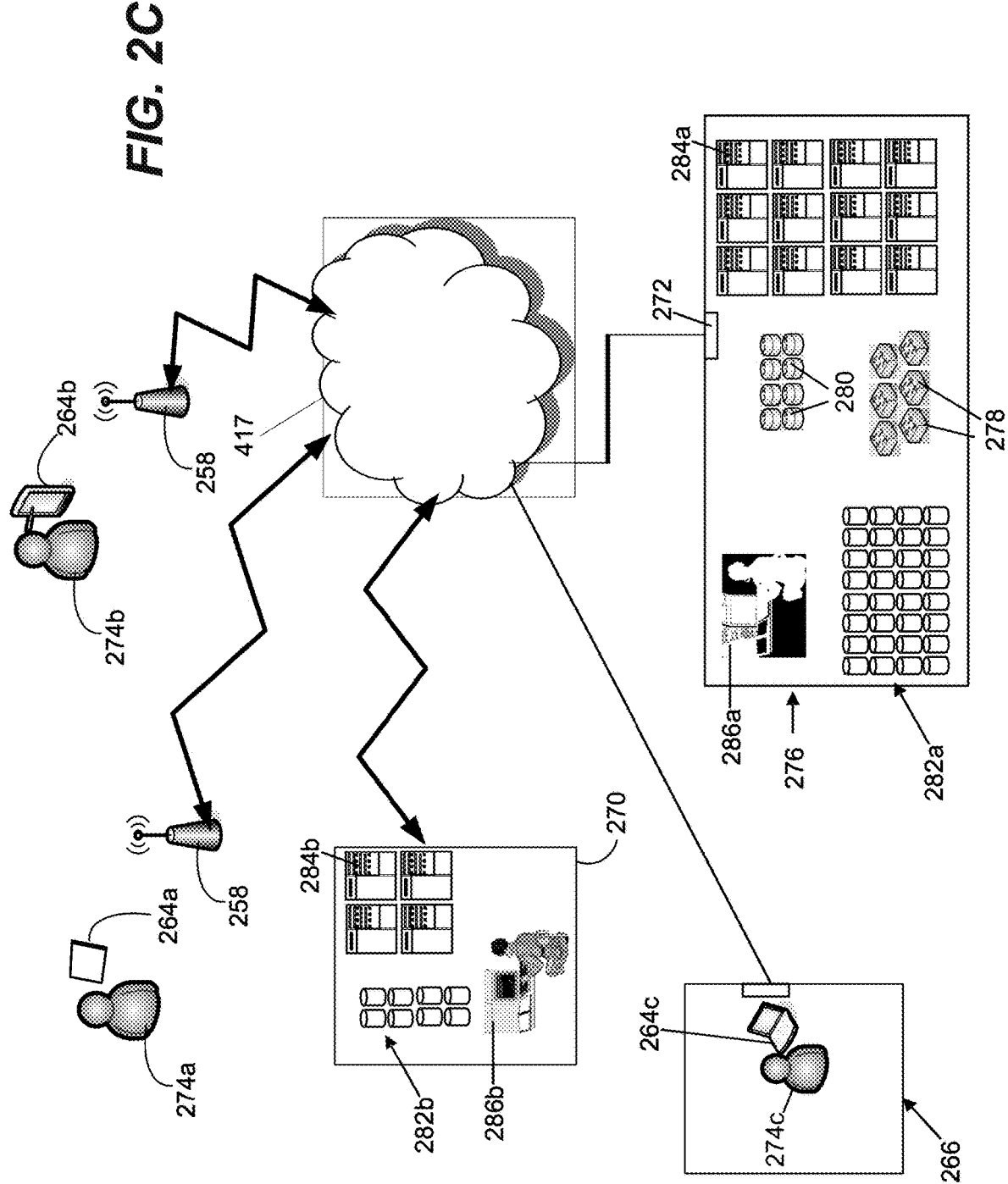

STACKS OF STICKY WILD SYMBOLS

CLAIM OF PRIORITY

This application claims the benefit of priority of U.S. Provisional Application 63/203,847, filed Aug. 2, 2021, which is herein incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Some embodiments provide a gaming device, a method, and a gaming system that tracks the number of special symbols that land over a period of spins and unlocks new levels based on reaching a threshold numbers of accumulated special symbols. The new levels may unlock one or more additional game windows and/or place a stack of sticky wild symbols on one or more reels of one or more of the unlocked game windows. The stacks of sticky wild symbols are persistent for the remaining spins of the game, such that the multiplier increases while the available reel positions for achieving the threshold numbers of accumulated special symbols decreases.

A first embodiment provides a gaming system including a display system and a game controller that includes one or more processors. The game controller executes instructions which cause the game controller to control the display system to display a first unlocked game window including a reel grid. Executing the instructions further causes the game controller to randomly determine, using a random number generator, display symbols for the reel grid, the display symbols selected from a first symbol set including a plurality of special symbols. Executing the instructions further causes the game controller to track accumulated special symbols. Accumulated special symbols are special symbols that land as display symbols on the reel grid over a period of spins. Executing the instructions further causes the game controller to unlock a new level responsive to achieving a first threshold of accumulated special symbols. Executing the instructions further causes the game controller to replace one or more reels of the reel grid with a stack of sticky wild symbols that remain in the same reel position for all remaining spins. Each stack of sticky wild symbols prevents the one or more reels from landing special symbols for subsequent spins. Executing the instructions further causes the game controller to control the display system to display the stack of sticky wild symbols. The first symbol set includes a first plurality of reel strips, each reel strip of the first plurality of reel strips having a value. Replacing one or more reels of the reel grid with a stack of sticky wild symbols includes choosing which reel of the reel grid to replace based on the value of its reel strip, such that a reel having a higher value reel strip is replaced with a stack of sticky wild symbols prior to a reel having a lower value reel strip.

Another embodiment provides a gaming system that includes a user interface system for receiving an indication to initiate one or more instances of a slot game, a display system including one or more displays, and a control system including one or more processors. The control system executes instructions which cause the control system to perform operations including receiving, via the user interface, an indication to initiate a spin of the instance. Executing the instructions further causes the game controller to perform operations including randomly selecting, using a random number generator, display symbols for reels of a first game window. The display symbols are randomly selected from a first set of reel strips, each reel strip of the first set of reel strips corresponding to a reel of the first game window. Executing the instructions further causes the game controller to perform operations including tracking special symbols that land as display symbols over multiple spins of the instance to determine a number of tracked special symbols. Executing the instructions further causes the game controller to perform operations including determining whether a new level is unlocked by comparing the number of tracked special symbols to one or more threshold values. Executing the instructions further causes the game controller to perform operations including responsive to the number of tracked special symbols meeting or exceeding one or more threshold values, replacing one or more reels of the first game window with a stack of sticky wild symbols. The stack of sticky wild symbols replaces the one or more reels of the first game window for remaining spins of the instance. Further, the one or more reels are selected based on a value of its corresponding reel strip, such that reels associated with higher value reel strips are prioritized for replacement with a stack of sticky wild symbols over reels associated with lower value reel strips. Executing the instructions further causes the game controller to perform operations including responsive to the number of tracked special symbols meeting or exceeding one or more threshold values, unlocking a second game window. Executing the instructions further causes the game controller to perform operations including controlling the display system to display the stack of sticky wild symbols in place of the one or more reels for the remaining spins of the instance.

Another embodiment provides one or more machine-readable devices storing instructions. The instructions when executed by one or more processors, cause performance of operations, including randomly selecting, using a random number generator, display symbols for each reel of a reel grid of a first unlocked game window, the display symbols for each reel of the reel grid selected from a corresponding reel strip, each reel strip including a plurality of special symbols and having a value. The instructions when executed by one or more processors, further cause performance of operations, including tracking accumulated special symbols, which are special symbols that land as display symbols on the reel grid over a period of spins. The instructions when executed by one or more processors, further cause performance of operations, including advancing to a first new level responsive to meeting or exceeding a first threshold of accumulated special symbols. The instructions when executed by one or more processors, further cause performance of operations, including responsive to advancing to the first new level, replacing the reel of the reel grid that corresponds to the reel strip with the highest value with a stack of sticky wild symbols that persists in place of the reel for all remaining spins.

BRIEF DESCRIPTION OF THE DRAWINGS

FIG. 2C is a diagram that shows examples of components of a system for providing online gaming according to some aspects of the present disclosure.

DETAILED DESCRIPTION

Figure 1:
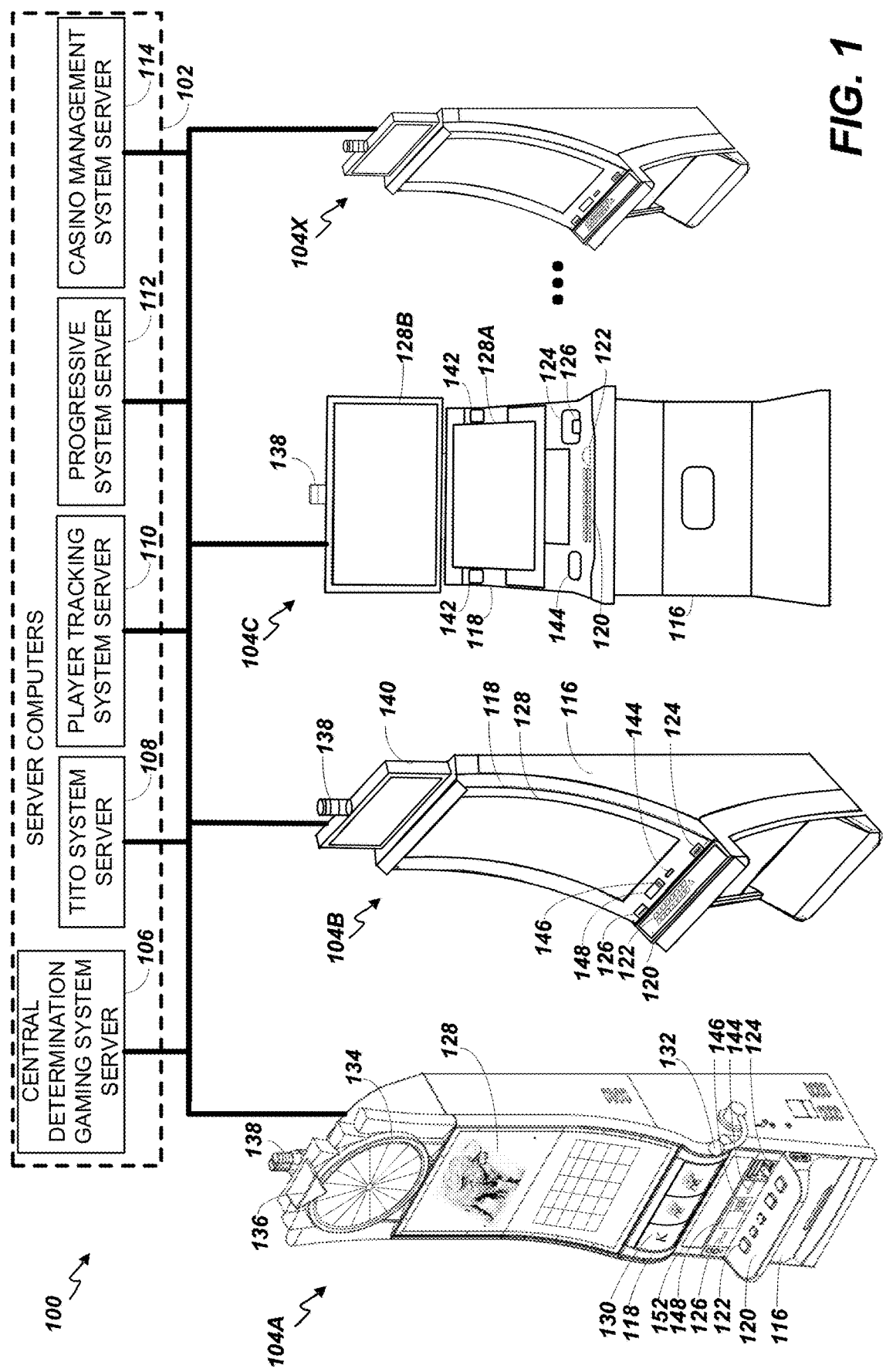
FIG. 1 is an exemplary diagram showing several EGMs networked with various gaming related servers.

The present disclosure is generally directed to providing a stack of sticky wild symbols across multiple game windows while unlocking game windows based on random game outcomes. A special symbol meter tracks accumulated special symbols that land on reels over a period of spins. Once a threshold number of accumulated special symbols has been met or exceeded, a new level is unlocked which may unlock a new game window having new reels, and/or may place a stack of sticky wild symbols on one or more reels of one or more unlocked game windows. Subsequent spins determine display symbols for reels of unlocked game windows but not for the reels that have a stack of sticky wild symbols. The stack of sticky wild symbols remains in the same position over a period of spins, for example, until there are no remaining spins or the game (i.e., base game, bonus game, or feature game) ends.

In terms of technical effects, the gaming device achieves a designated game RTP and volatility that complies with regulation for a game feature that generates stacks of sticky wild symbols across reels while generating random game outcomes to unlock additional game windows. In contrast to conventional features that land special symbols to unlock additional game windows for simultaneous game play, the present disclosure places stacks of sticky wild symbols on reels while simultaneously providing opportunities to unlock game windows. As stacks of sticky wild symbols overwrite/replace symbols that land on a reel grid, the reel grid has fewer symbol spaces to land special symbols that unlock additional game windows, generate additional stacks of sticky wild symbols, and/or trigger other pay increasing features. For example, in a 4×6 reel grid, with no sticky wild symbols, the reel grid has 24-reel spaces to land special symbols to progress to a next level. However, when the entire second reel is replaced with a stack of sticky wild symbols, the reel grid has 20 remaining reel spaces to land special symbols for subsequent spins. As more reels are replaced with stacks of sticky wild symbols, fewer and fewer reel spaces are available to progress to subsequent levels that correspond with unlocking game windows and/or placing additional stacks of sticky wild symbols on other reels. Moreover, as more games are unlocked and more stacks of sticky wild symbols are placed on the game windows, the game RTP increases and would need to be balanced, for example, by using reel strips with different RTP for different game windows. For example, earlier unlocked game windows may have a set of reel strips with a higher RTP than later unlocked game windows. Thus, the gaming device improves computer capability by achieving a designated volatility with the features of unlocking additional game windows and/or stacks of sticky wild symbols while also achieving a designated RTP by the stacks of sticky wild symbols limiting the available spaces (and therefore likelihood) of unlocking a new level and by using different reel strips for different game windows.

The special symbol meter also allows a player to more easily understand how new game windows will be unlocked since the player can track progress with the meter, thus improving computer usability. Providing a stack of sticky wild symbols across multiple game windows while unlocking game windows based on random game outcomes represents new EGM functionality not previously implemented that provides another approach to presenting how a gaming device builds equity in a game, improves the usability of the gaming device, and enhances a player's understandability of obtaining certain game outcomes.

In some examples, various described features may be implemented as part of a base game, a bonus game, a feature game, or a combination of these.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
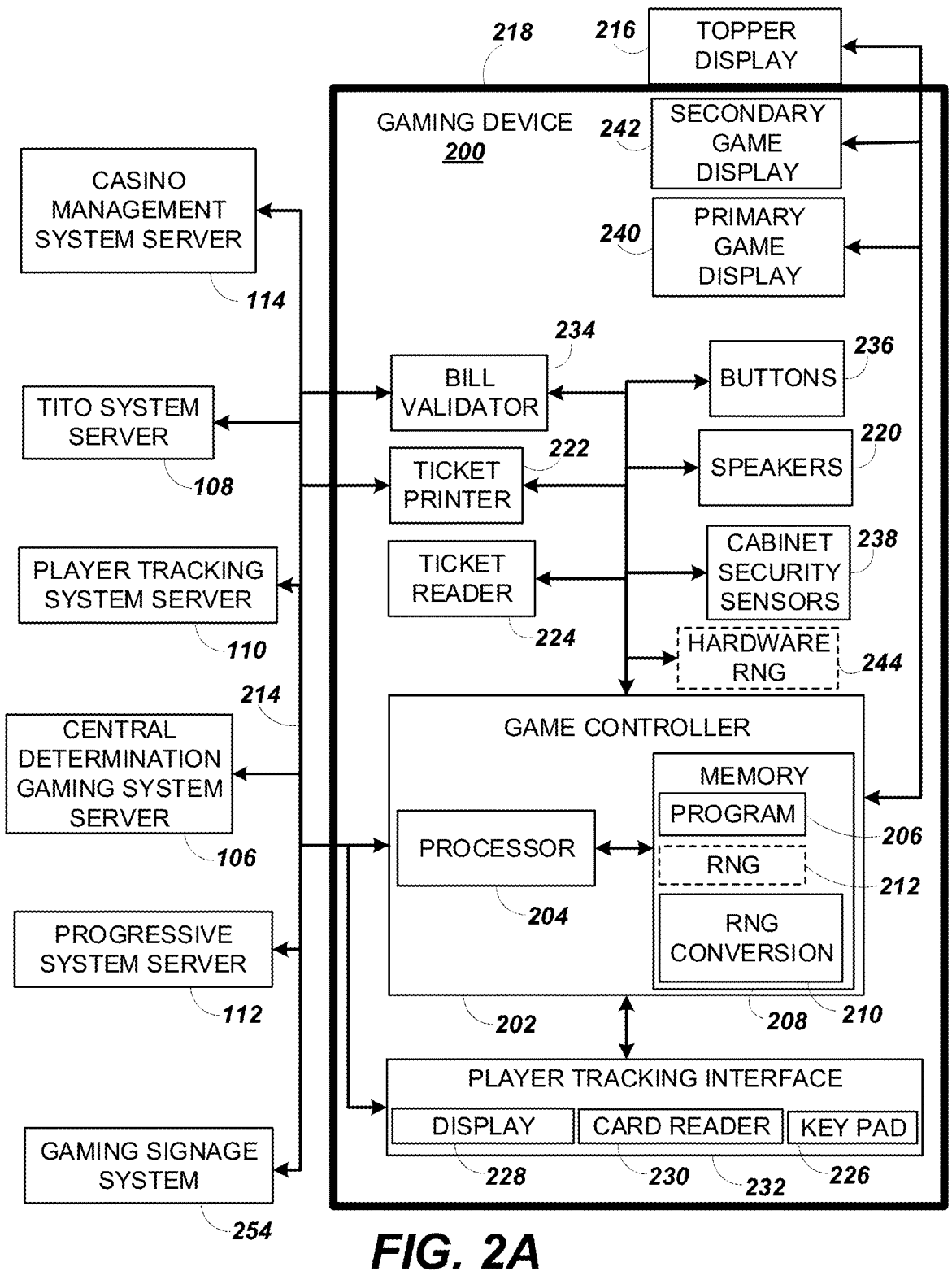
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
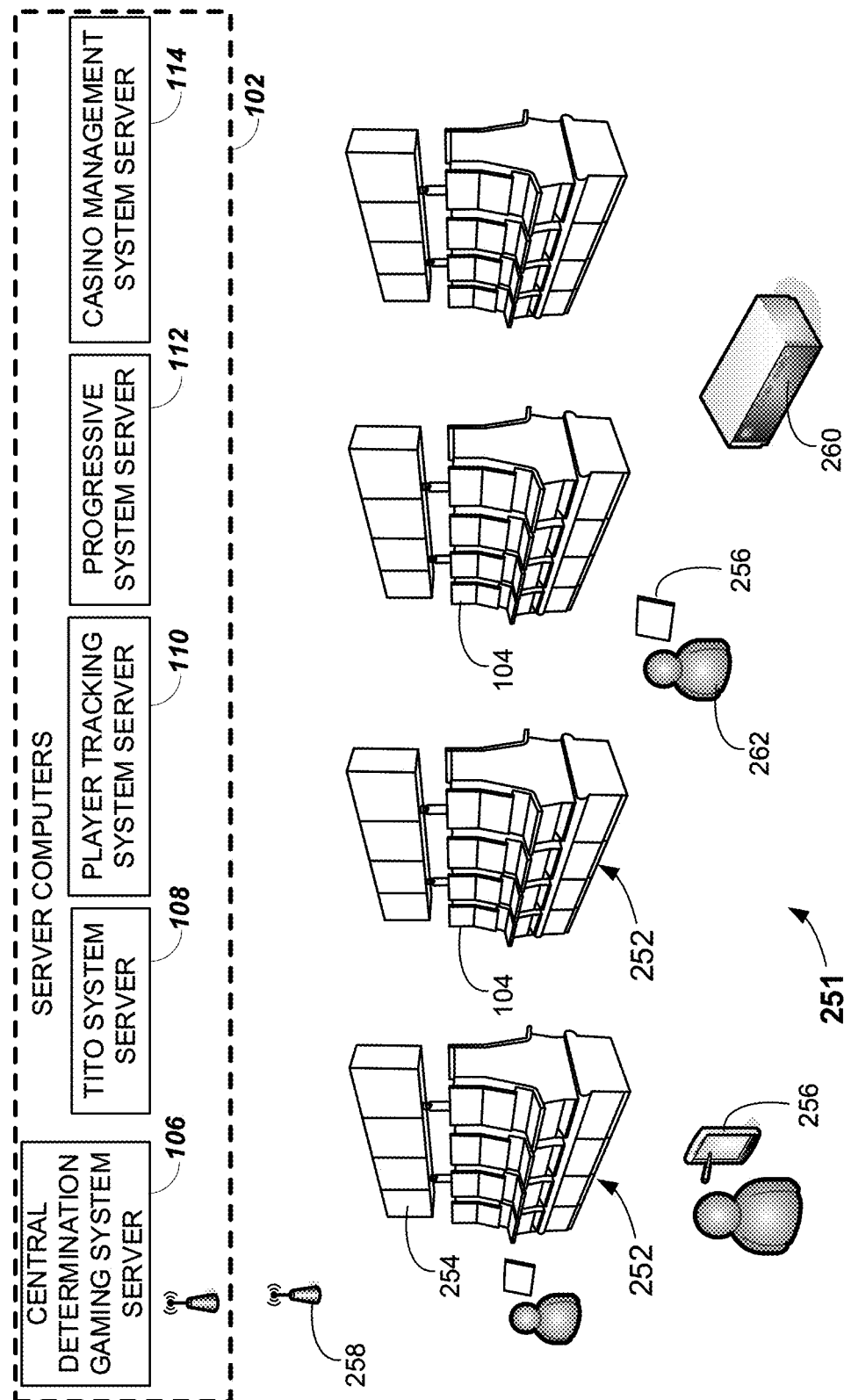
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
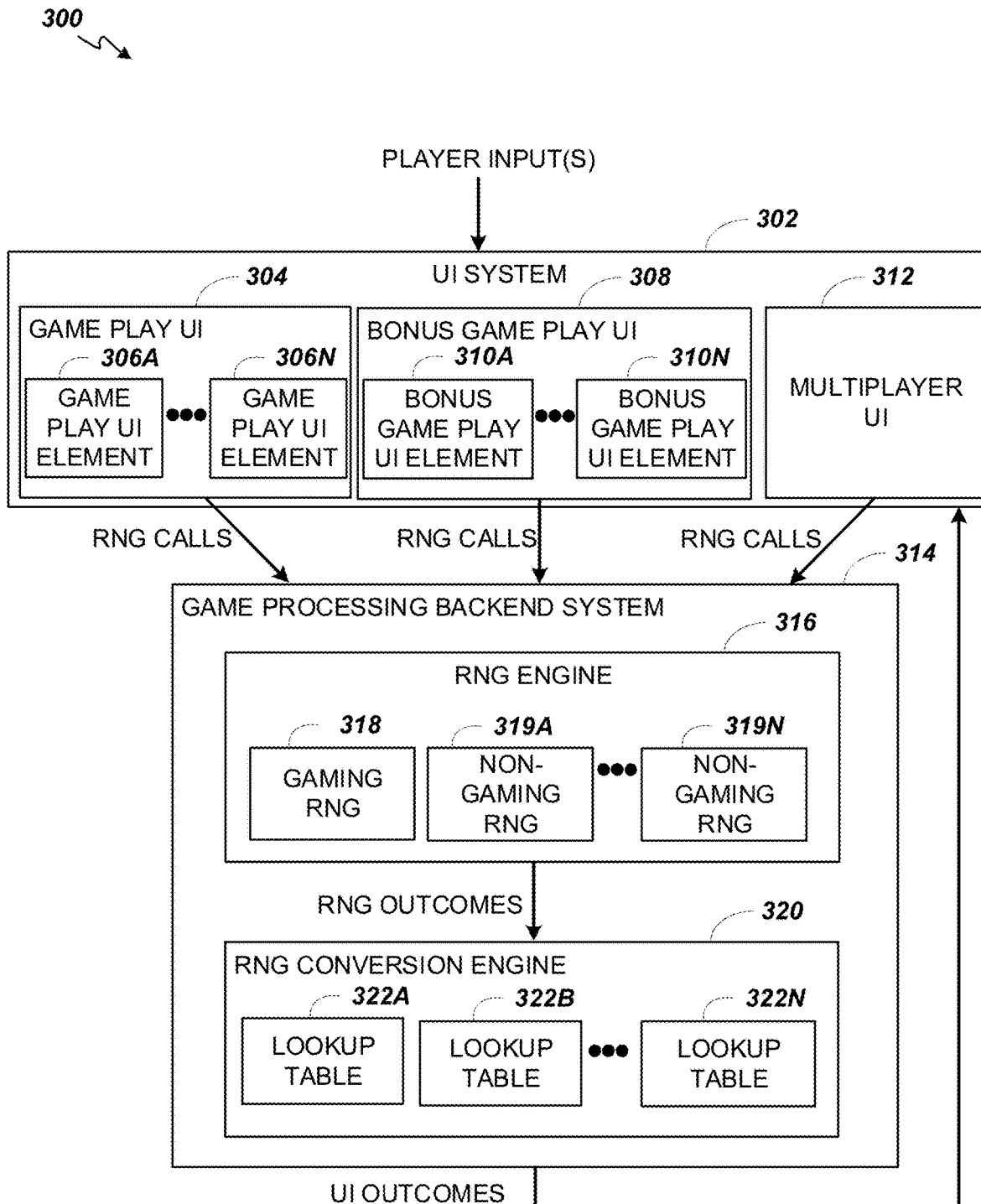
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (eg, GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The example game processing architecture 300 shown in FIG. 3 can be used to process game play instructions and generate outcomes as follows. In some example implementations, the game processing architecture 300 implements a game processing pipeline for a process (e.g. base reel game, bonus reel game, feature reel game, etc.) that provides stacks of sticky wild symbols across multiple game windows while unlocking game windows based on random game outcomes. The UI system 302 (e.g., the game play UI 304 or bonus game play UI 308 of the UI system 302) causes the display system (e.g. display 240, 242) to display a special symbol meter tracking accumulated special symbols, unlocked game windows, and stacks of sticky wild symbols corresponding to unlocked levels. For a play, the UI system 302 (e.g., the game play UI 304 or bonus game play UI 308) makes one or more RNG calls to the game processing backend system 314. In response, the backend system 314 performs various operations. For example, using a gaming RNG 318, the RNG engine 316 generates one or more random numbers, which are passed to the RNG conversion engine 320. In various embodiments, the RNG conversion engine 320, can use one or more of the random number(s) and one or more of the lookup tables 322A . . . 322N, to determine a set of display symbols to populate the reels, to select a selected symbol to substitute for dynamic symbols, or the like. After determining a game outcome, including evaluating multiple game windows with stacks of sticky wild symbols, the backend system 314 performs a pay evaluation or otherwise determines results (e.g., calculating whether any win conditions exist). The backend system 314 returns generated result to the game play UI 304 or bonus game play UI 308 of the UI system 302, which can among other operations control display of the game outcome and results corresponding to the pay evaluation. For example, the game play UI 304 or bonus game play UI 308 in various embodiments may stop the spinning of reels at the display symbols determined for respective reel outcomes, unlock additional game windows, place one or more stacks of sticky wild symbols, indicate win paths, or the like.

In general, the generated results returned by the backend system 314 can include game-related information (such as display symbols for the respective reels, outcomes) as well as animation effects not related to game parameters. Alternatively, the game play UI 304 (or bonus game play UI 308) can make one or more separate RNG calls to the backend system 314 to determine animation effects. In response, the backend system 314 can use the gaming RNG 318 and/or one or more of the non-gaming RNGs 319A . . . 319N to generate random numbers, which the RNG conversion engine 320 uses (with one or more of the lookup tables 322A . . . 322N) to determine animation effects. The game play UI 304 (or bonus game play UI 308) can perform operations consistent with the animation effects, which are returned from the backend system 314.

Figure 4:
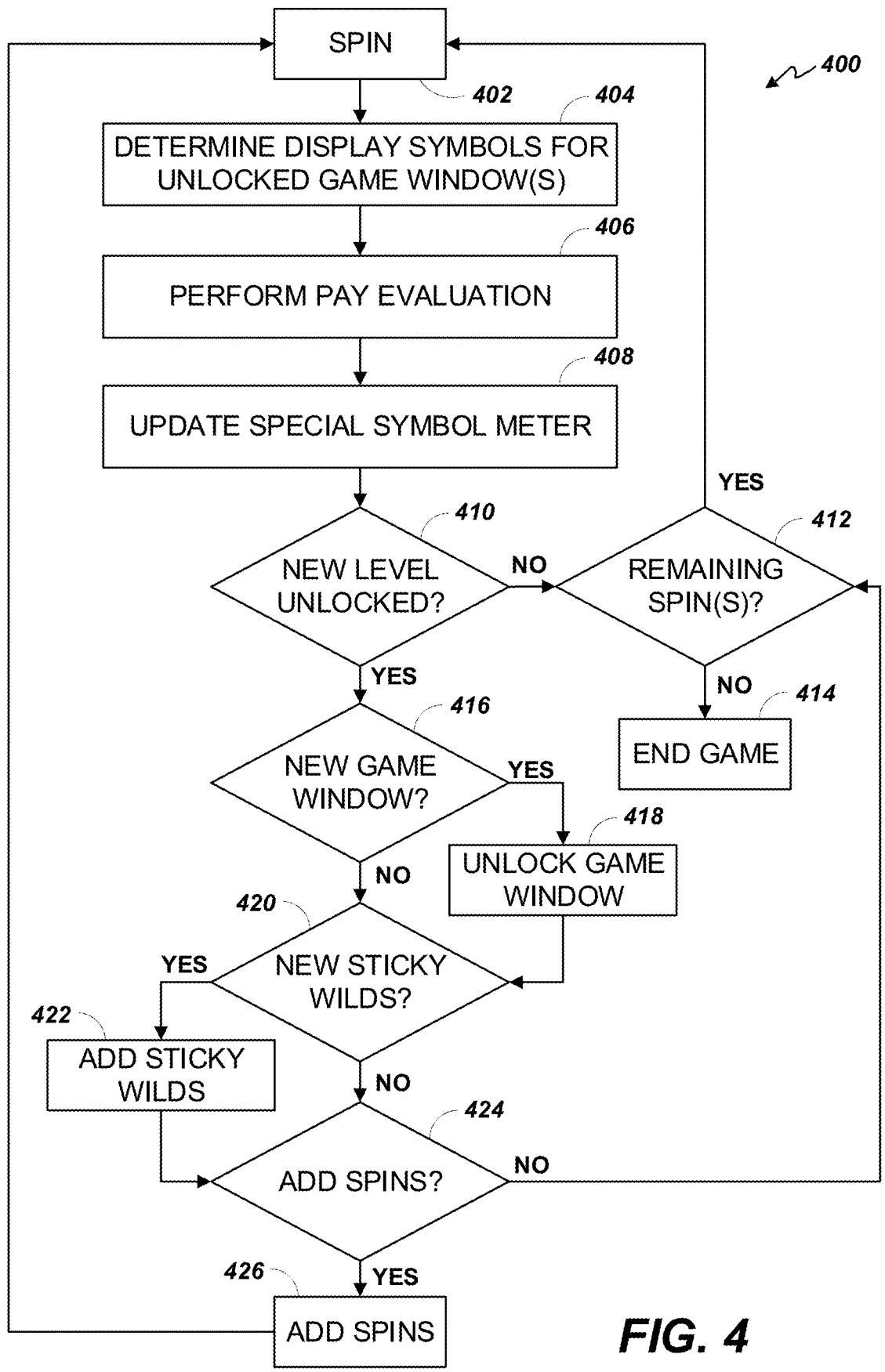
FIG. 4 is a flowchart illustrating an example method utilizing sticky wild symbols while providing opportunities to unlock game windows.

FIG. 4 is a flowchart illustrating an example method 400 utilizing sticky wild symbols while providing opportunities to unlock game windows. At 402, the game controller 202 registers a spin by a player. At 404, the game controller 202 determines display symbols for any unlocked game windows. In at least one example, the display symbols are selected from a set of symbols including configurable symbols, nonconfigurable symbols, and special symbols. In some examples, the display symbols are selected from a symbol set including a plurality of reel strips, each reel strip having a value based on the symbols of the reel strip and the effect of the reel strip on the RTP. For example, a reel strip having more higher paying symbols will have a higher value than a reel strip having fewer higher paying symbols. A reel strip that has a greater effect on increasing the payout will have a higher value than a reel strip that has a lesser effect on increasing the payout.

In some examples, the game might start with one single first unlocked game window having a reel grid. The game controller 202 randomly determines, using a random number generator, display symbols for each reel of the reel grid on the first unlocked game window. At 406 the game controller 202 determines a pay evaluation for the display symbols that landed on the reel grid of the first unlocked game window. At 408, the game controller 202 updates a special symbol meter with a number of special symbols that landed on the reel grid of the first unlocked game window. The special symbol meter tracks the number of accumulated special symbols over multiple spins, for example a period of spins corresponding to a complete game (which may be a base game, a bonus game, or a feature game).

At 410, the game controller 202 determines whether a new level has been unlocked by comparing the number of accumulated special symbols with a threshold number of accumulated special symbols. In at least one example the threshold number could be a static number. In at least one example, the threshold number could follow a sequence of threshold numbers. In some examples, the threshold number could be a dynamic number that changes based on an RNG call with weighted tables. In at least one example using an RNG call, the game could be configured to use an expected value that matches the static threshold number. If the accumulated special symbols do not meet or exceed the threshold number to unlock a new level, the method 400 proceeds to 412, at which the game controller 202 determines whether there are any remaining spins. If there are no remaining spins, the method 400 proceeds to step 414 and the game or instance ends. If there are remaining spins, the method 400 returns to 402 and a subsequent spin can be initiated. If at 410 the game controller 202 determines that the accumulated number of special symbols meets or exceeds the threshold number to unlock a new level, the method 400 proceeds to 416, at which the game controller 202 determines whether the new level unlocks a new game window. If the new level unlocks a new game window, at 418, the game controller 202 unlocks or otherwise makes available the new game window having a reel grid. In at least one example, the reel grid in the new game window has the same dimensions as the reel grid of the first unlocked game window. In some examples, each new level will unlock a new game window up to a maximum number of game windows (for example, up to 3 game windows).

Next, at 420, the game controller 202 determines whether unlocking the new level unlocks one or more stacks of sticky wild symbols. If the new level unlocks one or more stacks of sticky wild symbols, the method 400 proceeds to 422 and the game controller 202 places or otherwise controls the display system to display the one or more stack of sticky wild symbols. The stack of sticky wild symbols replaces a reel of a reel grid of an unlocked game window with all wild symbols, and the wild symbols persist through the rest of the spins until that game or instance ends (e.g., the player runs out of spins). In at least one example, the stack of sticky wild symbols is displayed as a single wild symbol (which may extend for the entire reel) with a multiplier. That is, the game controller 202 controls the display system to display the stack as a single symbol with an assigned multiplier value, and any pay evaluation treats the stack as a single symbol and applies the assigned multiplier. In some examples, the controller 202 places one or more new stacks of sticky wild symbols according to a predefined sequence corresponding to the unlocked level. In at least one example, the game controller 202 places the one or more new stacks of sticky wild symbols randomly using a random number generator and a lookup table when each new level is unlocked. In some examples, the game controller 202 places one single new stack of sticky wild symbols on a single unlocked game window with each new level that is unlocked. In some examples, the controller 202 places multiple stacks of sticky wild symbols with each new level on a single unlocked game window or spread across multiple unlocked game windows.

The method 400 then proceeds to 424, and the controller 202 determines whether unlocking the new level adds more spins. In some examples, unlocking a new level always adds spins (which may be a predefined number of spins or a random number of spins selected using a random number generator). If adding the new level does not add new spins, the method returns to 412 and the controller 202 determines whether any spins remain, and if so, the method 400 returns to 402 to allow for another spin to be initiated. If no spins remain the method 400 proceeds to step 414 to end the game. If at 424 the controller determines that spins are added, the method 400 proceeds to 426 and the controller 202 adds the spins, then the method returns to 402 to allow for a subsequent spin to be initiated. The method 400 continues to allow for spins to be initiated as long as spins remain. Further, as long as the number of accumulated special symbols continues to meet or exceed each threshold number corresponding to unlocking another level, the controller 202 will unlock new subsequent levels and place corresponding stacks of sticky wild symbols until a maximum level has been reached (e.g., level 9, etc.) and/or a maximum number of reels have been replaced with stacks of sticky symbols. In at least one example, when the method 400 proceeds until a player has reached the maximum level, there is no longer a special symbol threshold value to try and reach, and instead each remaining spin is played out for its value and the pay evaluations of each spin are added to the total until there are no longer any remaining spins. In at least one example, each additional special symbol is tracked, and a bonus is applied to the excess number of special symbols over the threshold number required to unlock the last level.

Figure 5:
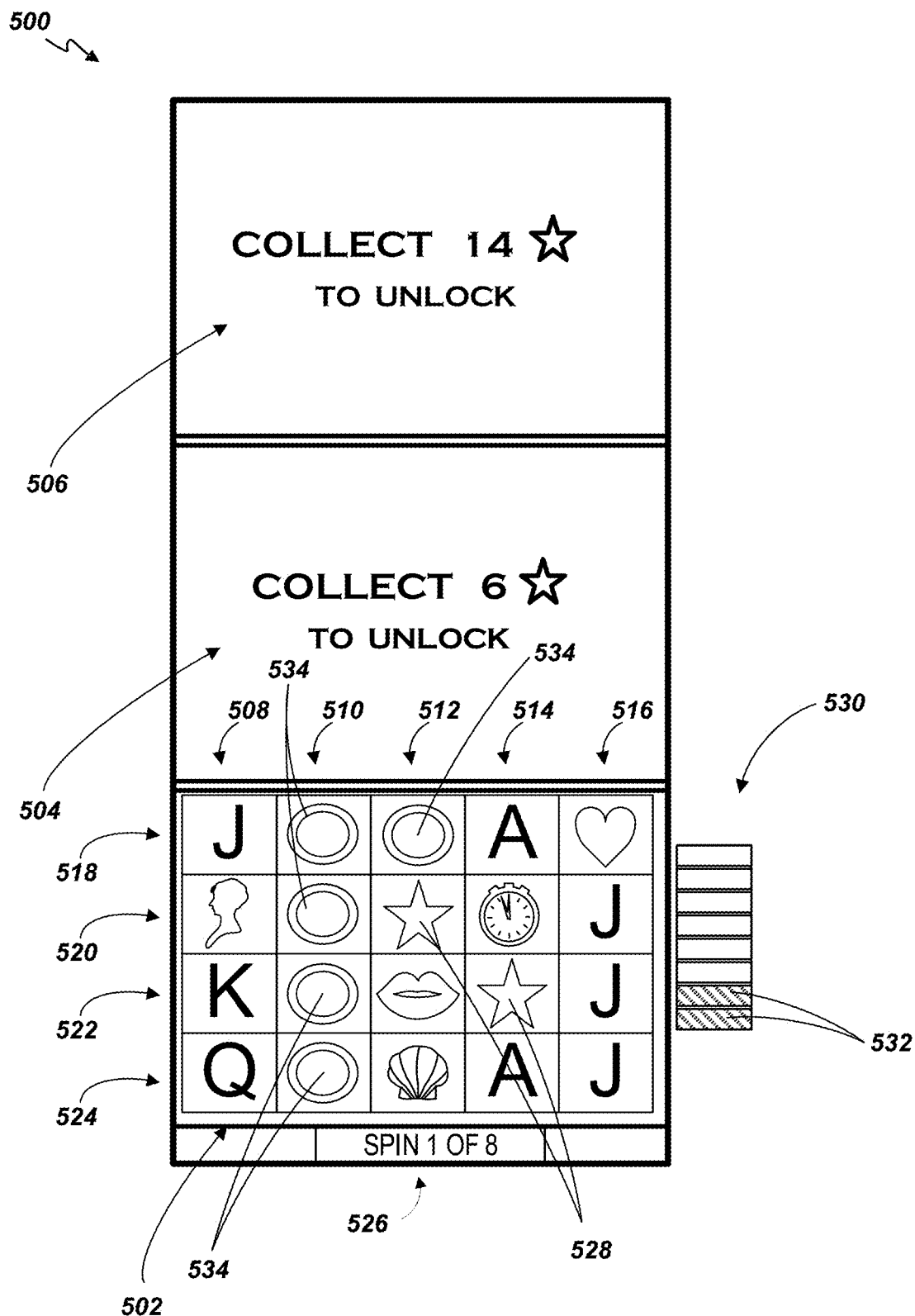
FIG. 5 is an example screen display showing a first unlocked game window and two locked games.

FIG. 5 is an example screen display 500 showing a first unlocked game window 502 and two locked games 504, 506. In the illustrated example, the first unlocked game window 502 includes a 4×5 reel grid having reels 508, 510, 512, 514, 516 each having a number of positions 518, 520, 522, 524 for symbols to be displayed. However, other examples may include a reel grid of different dimensions. A spin counter 526 indicates the current spin number and the total available spins in the illustrated example, however other examples may just indicate the number of remaining spins. In the illustrated example, the controller 202 has randomly determined the display symbols for each of the reels 508, 510, 512, 514, 516 using a random number generator and has controlled the display system to display the display symbols, including two special symbols 528. The special symbols 528 can be any predesignated symbol. In some examples, the special symbols are randomly generated for a given game or instance. In some examples, the special symbol may be selected to replace dynamic symbols for a given game or instance. In the illustrated example, special symbol meter 530 indicates via indicator 532 that two special symbols 528 have accumulated. If this was not the first spin, this would indicate that previous spins did not land any special symbols 528 since the special symbol meter 530 shows the accumulated special symbols 528 over a period of spins or game instances (and currently only shows the two special symbols accumulated during this spin). In some examples, each new level provides a new special symbol meter 530 and indicator 532, and in at least one example leftover or excess special symbols 528 beyond the threshold number are applied to the indicator 532 of the new special symbol meter 530. In some examples, each new level adds spaces to the existing special symbol meter 530. In some examples, the special symbol meter 530 changes with each new window unlocked rather than each new level. In other examples, the special symbol meter 530 and the indicator 532 can have any of a variety of appearances and be in an of a variety of positions. In at least one example the special symbol meter 530 and/or the indicator 532 may include one or more symbols, digital numbers, a combination of these, or the like. In some examples, the special symbol meter 530 and/or indicator 532 may indicate one or more of the threshold numbers of special symbols 528 that will unlock one or more new levels. In the illustrated example, the locked game windows 504, 506 indicate the remaining number of special symbols 528 required to reach the threshold number to unlock each of the windows, with the second game window 504 unlocking when 6 additional special symbols 528 have accumulated (a threshold of 8 total special symbols), and the third game window 506 unlocking when 14 additional special symbols 528 have accumulated (a threshold of 16 total special symbols). In the illustrated example, reel 510 has landed a stack of wild symbols 534. In other examples, the stack of wild symbols 534 may be displayed in any of a variety of manners, for example the entire reel 510 may be replaced with a new graphic, a single symbol, a multiplier, a combination of these, or the like. Further, other examples may use a different symbol to indicate a "wild" symbol. In other examples, the stacks of sticky symbols are symbols other than "wild" symbols. Some reels, for example the second reel 510 in the illustrated example, may land one or more wild symbols 534 without landing a stack of wild symbols 534. In at least one example, stacks of wild symbols that randomly land as display symbols may be treated as stacks of sticky wild symbols such that they persist through subsequent spins. In the illustrated example, the stack of wild symbols that randomly landed as display symbols on the second reel 510 of the first game window 502 is not a stack of sticky wild symbols, such that subsequent spins may land different display symbols.

In accordance with the method 400 of FIG. 4, the game controller 202 would perform a pay evaluation based on the displayed symbols, and since a threshold number of special symbols 528 have not accrued, a new level cannot be unlocked, so the game controller 202 would recognize that there are still spins remaining as indicated by the spin counter 526 ("Spin 1 of 8"), and the controller 202 would allow for a subsequent spin to be initiated to accrue additional special symbols 528 and earn additional wins or credits. In some examples, the first level may start with a stack of wild symbols 534, for example in the illustrated example, the second reel 510 may have started with the stack of wild symbols 534 rather than having landed the wild symbols 534. In some examples, only certain reels are capable of landing a stack of wild symbols 534. In some examples, none of the reels are capable of landing a stack of wild symbols, but only receive stacks of wild symbols with level progression.

Figure 6:
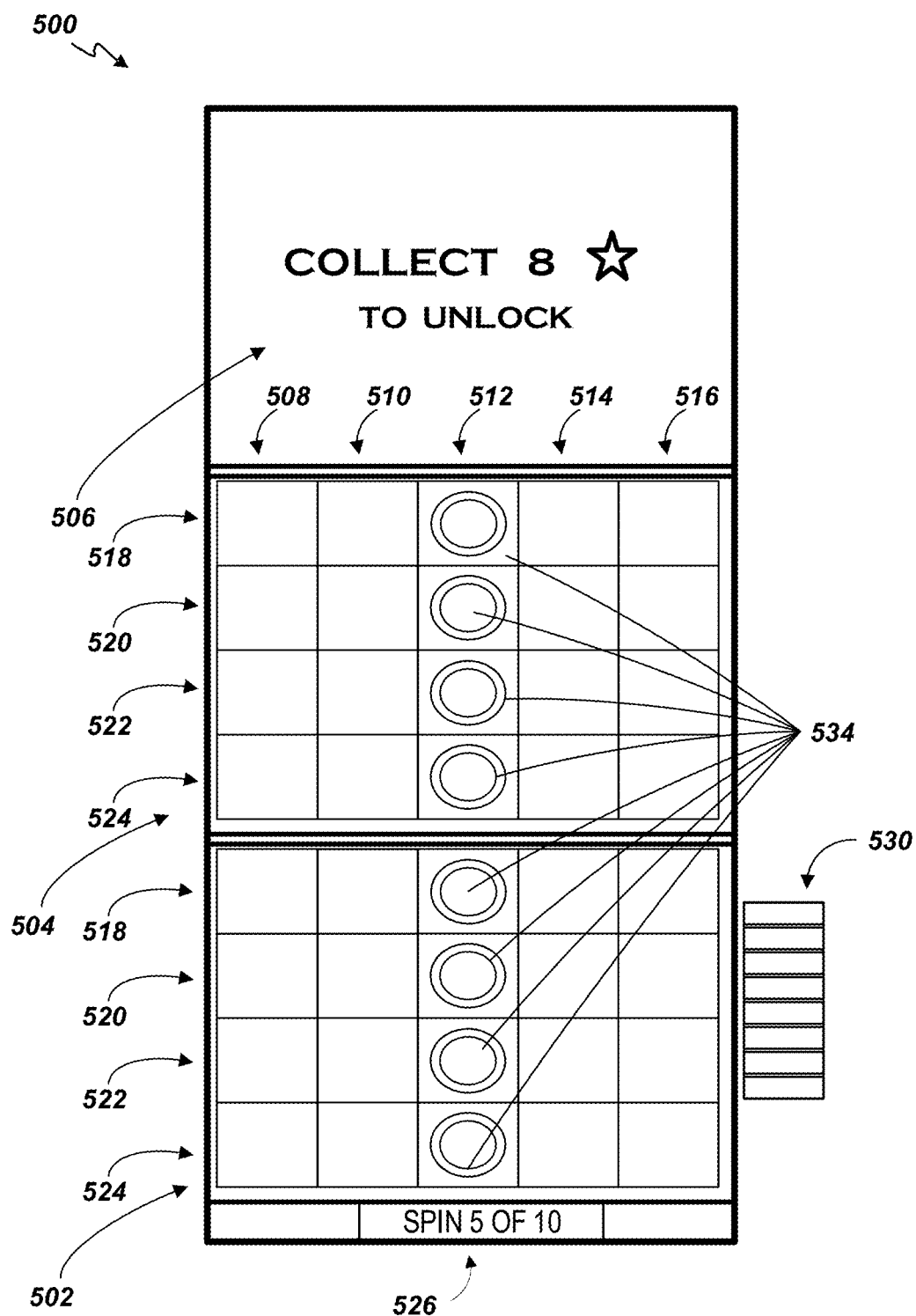
FIG. 6 is the example screen display of FIG. 5 after a second game window and two stacks of sticky wild symbols have been unlocked.

FIG. 6 is the example screen display 500 of FIG. 5 after four additional spins, as indicated by the spin counter 526 (in the illustrated example, the outcome of the 5$^{th}$ spin has been cleared but the 6$^{th}$ spin has not been initiated). In those four additional spins, the player has: received 2 additional spins (spin counter 526 indicates total spins has increased from 8 to 10), unlocked the second game window 504, and unlocked two stacks of sticky wild symbols 534. The unlocked second game window 504, like the first game window 502, includes a 4×5 reel grid having reels 508, 510, 512, 514, 516 each having a number of positions 518, 520, 522, 524 for symbols to be displayed. The unlocked stack of sticky wild symbols 534 have been placed on the third reel 512 of each of the first game window 502 and the second game window 504. In the illustrated example, a new special symbol meter 530 is displayed (or alternatively the indicators 532 have been removed from the original special symbol meter 530) such that the special symbol meter 530 is now empty of indicators 532 and ready to track special symbols 528 toward a new threshold. In an alternative example, the original special meter 530 could track the special symbols 528 through all levels, such that the previous 8 special symbols 528 needed to unlock the second game window 504 would still be displayed via the indicators 532. In at least one example, the special symbol meter 530 expands or otherwise changes to accommodate the next threshold.

In the illustrated example of FIG. 5 the second game window 504 indicated that 6 additional special symbols 528 were needed to unlock the second game window 504, and the third game window 506 indicated that 14 additional special symbols 528 were needed to unlock the third game window 506. In the course of the four additional spins between FIG. 5 and FIG. 6, six additional special symbols 528, such that in FIG. 6, the second game window 504 is unlocked and the third game window 506 indicates that only 8 additional special symbols 528 are needed to reach the threshold to unlock the third game window 506. The stacks of sticky wild symbols 534 could have been unlocked through reaching thresholds of special symbols 528, randomly, through landing one or more triggering symbols on the first game window 502, through unlocking the second game window 504, a combination of these or the like. In at least one example, the stacks of sticky wild symbols 534 persist throughout the game or instance, such that in the illustrated example, the third reel 512 of each of the first and second game windows 502, 504 will be populated with a stack of sticky wild symbols 534 for the rest of the game or instance. The reels of both of the first and second game windows 502, 504 that do not include stacks of sticky wild symbols 534 will land new display symbols with each subsequent spin. That is for the next spin, reels 508, 510, 514, 516 of both the first and second game windows 502, 504 will spin, while the third reels 512 of the first and second game windows will maintain their stacks of sticky wild symbols 534.

Figure 7:
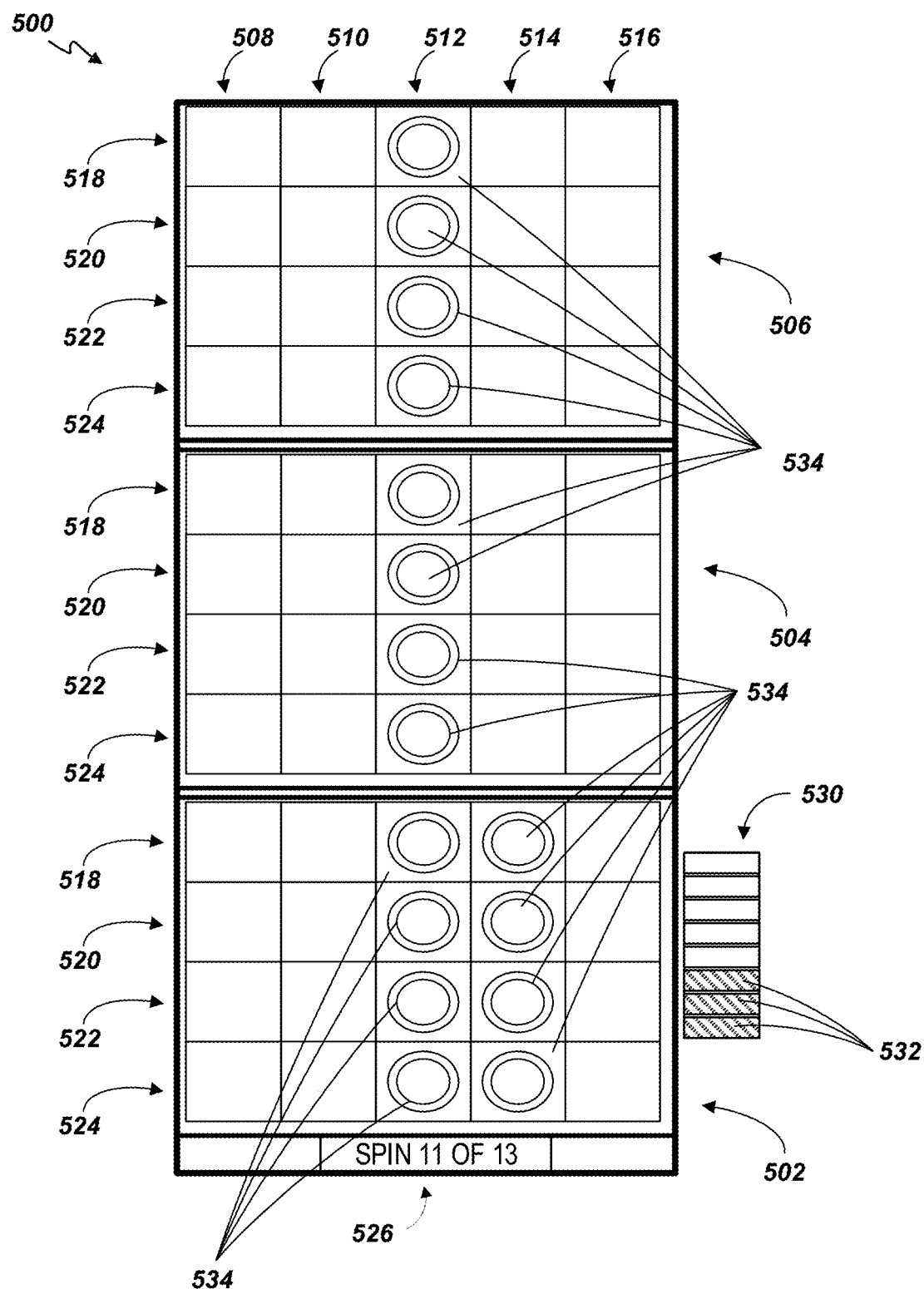
FIG. 7 is the example screen display of FIG. 6 after a third game window and two additional stacks of sticky wild symbols have been unlocked.

FIG. 7 is the example screen display 500 of FIG. 6 after six additional spins, as indicated by the spin counter 526 (in the illustrated example, the outcome of the 11$^{th}$ spin has been cleared but the 12$^{th}$ spin has not been initiated). In those six additional spins, the player has: received 3 additional spins (spin counter 526 indicates total spins has increased from 10 to 13), unlocked the third game window 506, unlocked two additional stacks of sticky wild symbols 534, and accumulated eleven additional special symbols 528 (as indicated by the eight special symbols 528 that were required to unlock the third game window 506 and the three indicators 532 on the special symbol meter 530). The unlocked third game window 506, like the first and second game windows 502, 504, includes a 4×5 reel grid having reels 508, 510, 512, 514, 516 each having a number of positions 518, 520, 522, 524 for symbols to be displayed. The previously unlocked stacks of sticky wild symbols 534 on the third reels 512 of each of the first and second game windows 502, 504 persisted, such that they are still present. Additionally, a stack of sticky wild symbols 534 was unlocked on the third reel 512 of the newly unlocked third game window 506. The third game window 506 may have unlocked with the stack of sticky wild symbols 534 present on its third reel 512, or the stack of sticky wild symbols 534 may have been unlocked after unlocking the third game window 506. In the illustrated example, an additional stack of sticky wild symbols 534 has been placed on the fourth reel 514 of the first game window 502. Since all of the game windows 502, 504, 506 have been unlocked, accumulation of additional special symbols 528 may result in the placement of additional stacks of sticky wild symbols 534, may unlock additional features, may contribute to the payout, a combination of these or the like. The reels of the first, second, and third game windows 502, 504, 506 that do not include stacks of sticky wild symbols 534 will land new display symbols with each subsequent spin. That is for the next spin, reels 508, 510, 516 of all three game windows 502, 504, 506 will spin, and the fourth reel 514 of the second and third game windows 504, 506 will spin, while the third reels 512 of the three game windows 502, 504, 506 and the fourth reel 514 of the first game window 502 will maintain their stacks of sticky wild symbols 534.

Figure 8:
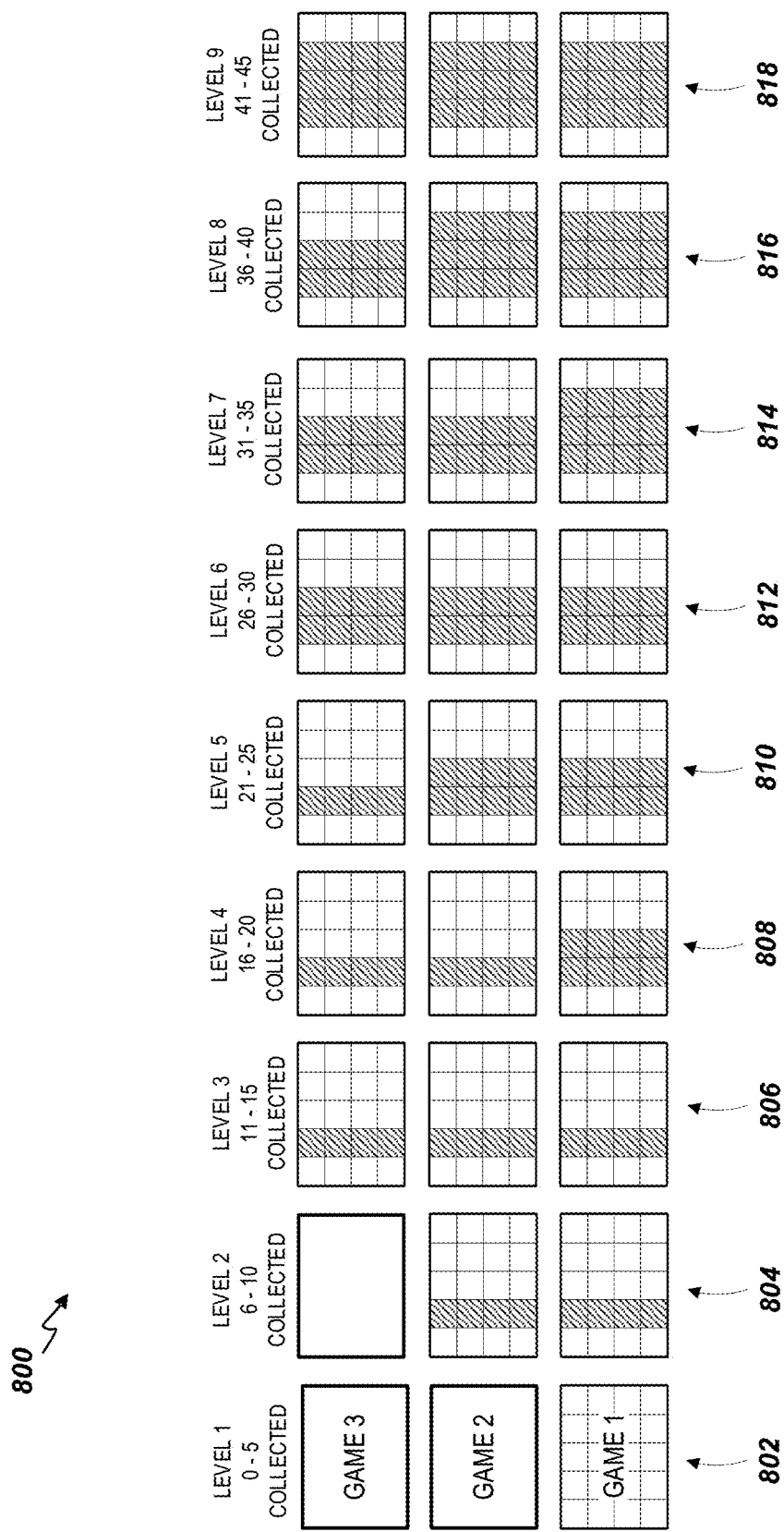
FIG. 8 is an example schematic showing a system for progression of unlocking game windows and placing stacks of sticky wild symbols through various levels

FIG. 8 is an example schematic 800 showing a system for progression of unlocking game windows and placing stacks of sticky wild symbols through various levels 802, 804, 806, 808, 810, 812, 814, 816, 818. In the illustrated example, at a first level 802 only a first game window is unlocked and no stacks of sticky wild symbols have been placed. The player will be provided a certain number of spins to reach the threshold value of 6 special symbols to unlock the second level 804, which will also unlock a second game window and place a stack of sticky wild symbols on the second reel of each of the first and second unlocked game windows. In some examples unlocking a new level automatically unlocks additional spins which will be added to any remaining spins the player had when the level was unlocked. In some examples there are other ways for a player to earn additional spins randomly through the display symbols on the unlocked game windows, or otherwise. In some examples, each level has an individual threshold number of special symbols and if a player accumulates more than the threshold number of special symbols, the extra or excess special symbols are counted toward the next threshold. However, in the illustrated example the threshold values are cumulative, such that the threshold value to unlock any given level includes the previous threshold value, such that a player goes into a new level with all of their previously accrued special symbols. In the illustrated example, the threshold number for each level increases by 5 relative to the threshold number for the preceding level.

In the illustrated example, all spins for level 2 and beyond will not be able to land any special symbols in the second reel of the first and second unlocked game windows, since the stack of sticky wild symbols will remain in those positions for all subsequent spins until the end of the instance or the end of the game. In some examples, the stack of sticky wild symbols may be displayed differently, for example in some example the stack of sticky wild symbols can be treated and/or displayed as a single symbol (which may span the entire reel) in which it is placed with an assigned multiplier, which may be a typical multiplier for a given stack size or may be a different assigned multiplier. In some examples, the stacks of sticky symbols are not "wild" symbols but instead other designated symbols that may contribute to a win combination. In the illustrated example, to unlock the third level 806, a player would have to accrue a threshold number of 11 special symbols (over the course of the first and second levels) via any unlocked window. In the first level, the player had 20 spaces to potentially land a special symbol per spin (one unlocked game window with a 4×5 grid). In the second level, the player has 32 spaces to potentially land a special symbol per spin (2 unlocked game windows with 4×5 grids and 2 stacks of sticky wild symbols=2×4×5−(2×4)=32).

When the third level 806 is unlocked, a third game window is unlocked and a stack of sticky wild symbols is placed on the second reel of the third game window. The player now has 48 spaces to potentially land a special symbol per spin and has to accrue a threshold number of 16 special symbols to unlock the fourth level 808 before running out of spins. In the illustrated example, when the fourth level 808 is unlocked, there are no additional locked game windows to unlock, but a stack of sticky wild symbols is added to a third reel of the first unlocked game window. The first unlocked game window now has two reels of stacked sticky wild symbols. In the fourth level 808, the player now has 44 spaces to potentially land a special symbol per spin. While the available spaces to potentially land a special symbol per spin increased between the first level 802 and the third level 806, the available spaces to potentially land a special symbol per spin decreases between the third level 806 and the fourth level 808 (and each subsequent level) because no additional game windows are unlocked but stacks of sticky wild symbols continue to be added. However, even though the stacks of sticky wild symbols decrease the likelihood of advancing to the next level, they increase the potential pay with their multiplier values.

Unlocking the fifth level 810 requires a threshold number of 21 special symbols, at which point a stack of sticky wild symbols is added to the third reel of the second unlocked game window and the available spaces to potentially land a special symbol per spin decreases to 40. Unlocking the sixth level 812 requires a threshold number of 26 special symbols, at which point a stack of sticky wild symbols is added to the third reel of the third unlocked game window and the available spaces to potentially land a special symbol per spin decreases to 36. Unlocking the seventh level 814 requires a threshold number of 31 special symbols, at which point a stack of sticky wild symbols is added to the fourth reel of the first unlocked game window and the available spaces to potentially land a special symbol per spin decreases to 32. Unlocking the eighth level 816 requires a threshold number of 36 special symbols, at which point a stack of sticky wild symbols is added to the fourth reel of the second unlocked game window and the available spaces to potentially land a special symbol per spin decreases to 28. Unlocking the ninth level 818 requires a threshold number of 41 special symbols, at which point a stack of sticky wild symbols is added to the fourth reel of the third unlocked game window and the available spaces to potentially land a special symbol per spin decreases to 24. In the illustrated examples, any remaining spins while at the ninth level 818 will be used simply for pay evaluations since there are no longer any levels or game windows to unlock.

In some examples, the first level 802 could open with a stack of sticky wild symbols on the first game window. In another example, the sequence 800 shown in FIG. 8 could include an additional level between the first level 802 and the second level 804 that unlocks as single stack of sticky wild symbols on the first game window (with only the first game window unlocked). Other examples may include more or fewer levels than shown. Other examples may include different levels or sequence of levels. Generally speaking, once a stack of sticky wild symbols has been unlocked or placed, it persists through a plurality of spins, through the instance, or through the game. In different examples, the stacks of sticky wild symbols may be unlocked on different reels or in a different order. In some examples, which reel receives the stack of sticky wild symbols may be randomly determined using a random number generator. In at least one example, when a new game window is unlocked it does not initially have any stacks of sticky wild symbols. In some examples, when a new game window is unlocked, it is unlocked with more than one stack of sticky wild symbols. In some examples, when a new game window is unlocked, the number of, and/or the location of, stack(s) of sticky wild symbols is randomly determined using a random number generator. In some examples, the number of levels and/or the sequence of levels can change per instance or game. In at least one example, the number of levels and/or the sequence of levels for a given instance or game could be randomly selected using a random number generator.

Figure 9:
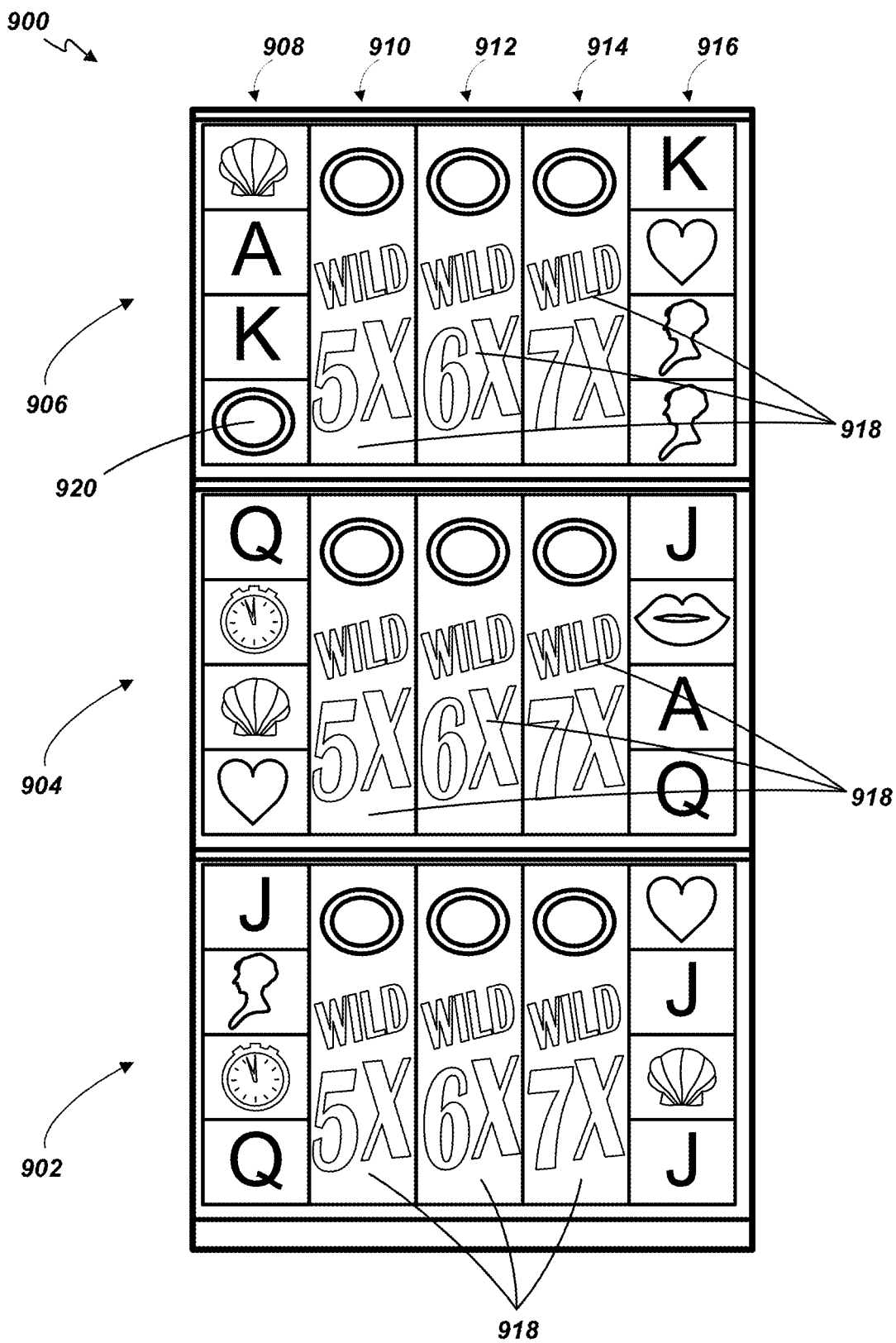
FIG. 9 is an example screen display showing a ninth level outcome with stacks of sticky wild symbols in three reels of three unlocked game windows.

FIG. 9 is an example screen display 900 showing a ninth level 818 outcome with stacks of sticky wild symbols 918 in three reels 910, 912, 914 of each of the first unlocked game window 902, the second unlocked game window 904, and the third unlocked game window 906. In the illustrated example, each of the stacks of sticky wild symbols is replaced with a single wild symbol and an assigned multiplier, however in other examples the stacks of sticky wild symbols may remain as individual wild symbols or may be displayed in any of a variety of manners to indicate the reel has a stack of wild symbols. In at least one example, the three multipliers of the three stacks of sticky wild symbols could be merged into a single multiplier such that each game window 902, 904, 906 would include a single multiplier of 210× (the product of 5×6×7). As can be seen in the illustrated example, other wild symbols 920 can randomly land as a display symbol in spaces not occupied by stacks of sticky wild symbols just as other symbols randomly land as display symbols for the reels.

As described with reference to FIGS. 4-9, the described method, gaming device, and gaming system is technically rooted in gaming technology that generates stacks of sticky wild symbols while unlocking game windows for simultaneous game play. As the game (i.e., base game, bonus game, feature game, etc.) accumulates special symbols, the game progresses to subsequent levels to unlock game windows and/or stacks of sticky wild symbols. However, as stacks of sticky wild symbols overwrite/replace symbols that land on a reel grid, the reel grid has fewer symbol spaces to land special symbols that unlock additional game windows or generate additional stacks of sticky wild symbols. To allow for this feature while achieving a designated game RTP and volatility, the method, gaming device, and gaming system can include one or more of the following additional features.

The game could achieve a certain game volatility by adjusting the total number of levels for the game. For example, the game could be set to have a total of 3 levels or can be set to have a total of 9 levels. The more levels a game has could potentially reduce the game volatility for the future. Although the illustrated example has a static number of levels, other possible implementations could have a random number of levels.

To balance out the number of levels assigned, the reel strips can be constructed to include more special symbols as the number of levels increase; thereby, increasing the opportunity to reach higher levels. The inverse can be done for a game with a smaller number of levels; that is, the reel strips can be constructed to include fewer special symbols as the number of levels increase, thereby decreasing the chances of reaching further levels as the player advances. Thus, if the number of levels is randomly determined prior to entering the game, the level numbers would then dictate which reel strip set a game uses for the game.

The game can set a pre-defined sequence to add stacks of sticky wild symbols across the different reels. For example, the game could add stacks of sticky wild symbols on reels 2 for all game windows, then reel 3 for all game windows, reel 4 for all game windows, and lastly, reel 5 for all game windows. In some examples, the game could add stacks of sticky wild symbols to more than one game window at a time (e.g., each of the first, second, and third game windows each receive a new stack of sticky wild symbols when level 4 is unlocked).

Based on the pre-defined sequence, for games that have a relatively smaller number of levels, the reels that are replaced with stacks of sticky wild symbols earlier in the sequence may have more special symbols available. As an example, using the pre-defined sequence described above, reel 2 would have the most special symbols, reel 3 would have less than reel 2, reel 4 would have less than reel 3, and so forth. By doing so, as the stacks of sticky wild symbols replace reels, it becomes more difficult for the game to progress to subsequent levels, which may be desirable to avoid dramatic increases in game RTP and/or volatility.

For games that have a relatively large number of levels, more special symbols are placed on reels that are replaced later in the game. As an example, using the pre-defined sequence of adding stacks of sticky wild symbols described above, for a reel grid having six reels, reel 6 may be set up to have the most special symbols, with reel 5 having less than reel 6, reel 4 having less than reel 5, and so forth. By doing so, when the games replaces reels 2, 3, and 4 with stacks of sticky wild symbols, the game reduces the impact of stacks of sticky wild symbols by having a substantial number of special symbols on reels 5 and 6, such that the game can still has a controlled/balanced likelihood of advancing to new levels.

To balance the RTP, the initial unlocked game window has a set of reel strips that generate a higher RTP, while the second and third game windows are configured with reel strips that generate lower RTP. The reason for this is that only the first game window is available when the game first starts. As the game progressives, the RTP for each of the game windows eventually balances out as the stacks of sticky wild symbols replaces the reels. As an example, the reel strip of reel 2 of the initial game window could be constructed to have the highest values (in some examples, the most wild symbols) to initially provide higher payouts. However, reel 2 of the initial game window may be set as the first reel strip to be replaced with the stacks of wild symbols. Thus, in some examples, the game prioritizes replacing reels having higher value reel strips with stacks of sticky wild symbols (over reels having lower value reel strips). Alternatively, reel 2 on game windows 2 and 3 could have a lower value associated with lower payouts (e.g., less wild symbols). However, because the game replaces reels 2 on game windows 2 and 3 early in the sequence, the payouts for game windows 2 and 3 increase and become closer to game window 1. By doing so, the game achieves a targeted game RTP and volatility even though stacks of wild symbols are added to the game windows.

Other non-limiting example configurations are described in the following individually numbered Examples.

Example 1 is a gaming system comprising: a display system; and a game controller comprising one or more processors, the game controller executing instructions which cause the game controller to: control the display system to display a first unlocked game window including a reel grid; randomly determine, using a random number generator, display symbols for the reel grid, the display symbols selected from a first symbol set including a plurality of special symbols; track accumulated special symbols, wherein accumulated special symbols are special symbols that land as display symbols on the reel grid over a period of spins; unlock a new level responsive to achieving a first threshold of accumulated special symbols; replace one or more reels of the reel grid with a stack of sticky wild symbols that remain in the same reel position for all remaining spins, such that each stack of sticky wild symbols prevents the one or more reels from landing special symbols for subsequent spins; and control the display system to display the stack of sticky wild symbols; wherein the first symbol set includes a first plurality of reel strips, each reel strip of the first plurality of reel strips having a value; wherein replacing one or more reels of the reel grid with a stack of sticky wild symbols includes choosing which reel of the reel grid to replace based on the value of its reel strip, such that a reel having a higher value reel strip is replaced with a stack of sticky wild symbols prior to a reel having a lower value reel strip.

In Example 2, the subject matter of Example 1 optionally includes that the instructions further cause the game controller to: unlock a new game window including a reel grid responsive to unlocking the new level; and control the display system to display the first unlocked game window and the new game window, wherein subsequent spins include randomly determining, using a random number generator, display symbols for the reels of the first unlocked game window and the new game window except for the reels having stacks of sticky wild symbols.

In Example 3, the subject matter of Example 2 optionally includes that: the new level is a second level; the new game window is a second game window; display symbols for the second game window are randomly selected from a second symbol set including a plurality of the special symbols; and replacing a reel of the reel grid with a stack of sticky wild symbols includes: replacing one or more reels of the reel grid of the first unlocked game window with the stack of sticky wild symbols; and replacing one or more reels of the reel grid of the second game window with the stack of sticky wild symbols.

In Example 4, the subject matter of Example 3 optionally includes that: the one or more reels of the first unlocked game window is a second reel of the reel grid of the first unlocked game window, such that the second reel of the first game window is a stack of sticky wild symbols for all subsequent spins; and the one or more reels of the second game window is a second reel of the reel grid of the second game window, such that the second reel of the second game window is a stack of sticky wild symbols for all subsequent spins.

In Example 5, the subject matter of Example 4 optionally includes that the instructions further cause the game controller to: unlock a third level responsive to achieving a second predetermine threshold of accumulated special symbols; unlock a third game window including a reel grid responsive to unlocking the third level; replace the second reel of the third game window with a stack of sticky wild symbols that remains in the same reel position for all remaining spins; and for each subsequent spin, randomly determine, using a random number generator, display symbols for the third game window, the display symbols selected from a third symbol set including a plurality of the special symbols.

In Example 6, the subject matter of Example 5 optionally includes that the instructions further cause the game controller to: unlock one or more subsequent levels responsive to achieving one or more subsequent thresholds of accumulated special symbols, wherein the accumulated special symbols are special symbols that land as display symbols of the unlocked game windows over a period of spins; replace one or more additional reels of one or more of the unlocked game windows with a stack of sticky wild symbols, wherein each stack of sticky wild symbols remains in its reel position for all subsequent spins; and for each subsequent spin, randomly determine, using a random number generator, display symbols for the reels of the unlocked game windows except for each reel having a stack of sticky wild symbols.

In Example 7, the subject matter of Example 6 optionally includes that the first symbol set has a higher RTP than the second or third symbol sets.

In Example 8, the subject matter of any one or more of Examples 6-7 optionally include that: the first plurality of reel strips correspond to the reels of the first game window; the second symbol set includes a second plurality of reel strips corresponding to the reels of the second game window; the third symbol set includes a third plurality of reel strips corresponding to the reels of the third game window; and one or more reel strips of the first plurality of reel strips include more wild symbols than one or more reel strips of the third plurality of reel strips.

In Example 9, the subject matter of Example 8 optionally includes that the instructions further cause the game controller to: prioritize reel strips having more wild symbols when replacing reels with stacks of sticky wild symbols, such that the game controller replaces a reel corresponding to a reel strip that includes more wild symbols with the stack of sticky wild symbols before replacing reels corresponding to reel strips that include fewer wild symbols.

In Example 10, the subject matter of any one or more of Examples 1-9 optionally include that the instructions further cause the game controller to control the display system to display a special symbol meter to indicate the accumulated special symbols over the period of spins.

Example 11 is a gaming system, comprising: a user interface system configured for receiving an indication to initiate one or more instances of a slot game; a display system comprising one or more displays; and a control system comprising one or more processors, wherein the control system executes instructions which cause the control system to perform operations comprising: receive, via the user interface, an indication to initiate a spin of the instance; randomly selecting, using a random number generator, display symbols for reels of a first game window, wherein the display symbols are randomly selected from a first set of reel strips, each reel strip of the first set of reel strips corresponding to a reel of the first game window; tracking special symbols that land as display symbols over multiple spins of the instance to determine a number of tracked special symbols; determining whether a new level is unlocked by comparing the number of tracked special symbols to one or more threshold values; responsive to the number of tracked special symbols meeting or exceeding one or more threshold values, replacing one or more reels of the first game window with a stack of sticky wild symbols, wherein the stack of sticky wild symbols replaces the one or more reels of the first game window for remaining spins of the instance, wherein the one or more reels are selected based on a value of its corresponding reel strip, such that reels associated with higher value reel strips are prioritized for replacement with a stack of sticky wild symbols over reels associated with lower value reel strips; responsive to the number of tracked special symbols meeting or exceeding one or more threshold values, unlocking a second game window; and controlling the display system to display the stack of sticky wild symbols in place of the one or more reels for the remaining spins of the instance.

In Example 12, the subject matter of Example 11 optionally includes that executing the instructions causes the control system to perform operations further comprising: using a first reel strip of the first set of reel strips for one reel of the first game window; and using a second reel strip of the first set of reel strips for another reel of the first game window; wherein the first reel strip has more wild symbols than the second reel strip; and wherein the reel corresponding to the first reel strip is the first reel to be replaced with the stack of sticky wild symbols.

In Example 13, the subject matter of Example 12 optionally includes that executing the instructions causes the control system to perform operations further comprising: using a third reel strip of the first set of reel strips for yet another reel of the first game window; wherein the second reel strip has more wild symbols than the third reel strip; and wherein the reel corresponding to the second reel strip is second to be replaced with the stack of sticky wild symbols.

In Example 14, the subject matter of any one or more of Examples 11-13 optionally include wherein executing the instructions causes the control system to perform operations further comprising: randomly selecting, using a random number generator, display symbols for reels of the second game window, wherein the display symbols are randomly selected from a second set of reel strips, each reel strip of the second set of reel strips corresponding to a reel of the second game window.

In Example 15, the subject matter of Example 14 optionally includes that: unlocking the second game window includes one or more reels of the second game window replaced with a stack of sticky wild symbols that replaces the one or more reels for remaining spins of the instance; and randomly selecting display symbols for reels of the second game window, includes randomly selecting display symbols for all reels of the second game window except for the one or more reels replaced with a stack of sticky wild symbols.

In Example 16, the subject matter of Example 15 optionally includes that: the second game window includes a stack of sticky wild symbols in a reel position that corresponds to a reel position of a stack of sticky wild symbols in the first game window.

In Example 17, the subject matter of any one or more of Examples 11-16 optionally include wherein once the second game window is unlocked, the first game window and the second game window are both in play for remaining spins of the instance.

In Example 18, the subject matter of any one or more of Examples 11-17 optionally include wherein executing the instructions causes the control system to perform operations further comprising: randomly determining, using a random number generator, a total number of possible levels, wherein each level corresponds to a threshold value of the one or more threshold values for tracked symbols.

Example 19 is one or more machine-readable devices storing instructions, wherein the instructions when executed by one or more processors, cause performance of operations, comprising: randomly selecting, using a random number generator, display symbols for each reel of a reel grid of a first unlocked game window, the display symbols for each reel of the reel grid selected from a corresponding reel strip, each reel strip including a plurality of special symbols and having a value; tracking accumulated special symbols, wherein accumulated special symbols are special symbols that land as display symbols on the reel grid over a period of spins; advancing to a first new level responsive to meeting or exceeding a first threshold of accumulated special symbols; and responsive to advancing to the first new level, replacing the reel of the reel grid that corresponds to the reel strip with the highest value with a stack of sticky wild symbols that persists in place of the reel for all remaining spins.

In Example 20, the subject matter of Example 19 optionally includes that the instructions when executed by one or more processors, cause performance of operations, further comprising: advancing to a second new level responsive to meeting or exceeding a second threshold of accumulated special symbols; and responsive to advancing to the second new level, unlocking a second game window including a reel grid with one a stack of sticky wild symbols in place of one reel.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming system comprising:
a display system; and
a game controller comprising one or more processors, the game controller executing instructions which cause the game controller to:
control the display system to display a first unlocked game window including a reel grid;
randomly determine, using a random number generator, display symbols for the reel grid, the display symbols selected from a first symbol set including a plurality of special symbols;
track, by a special symbol meter, accumulated special symbols, wherein accumulated special symbols are special symbols that land as display symbols on the reel grid over a period of spins;
in accordance with a number of accumulated special symbols tracked by the special symbol meter satisfying a first threshold, unlock a new level;
replace one or more reels of the reel grid with a stack of sticky wild symbols that remain in the same reel position for all remaining spins, such that each stack of sticky wild symbols prevents the one or more reels from landing special symbols for subsequent spins; and
control the display system to display the stack of sticky wild symbols;
wherein the first symbol set includes a first plurality of reel strips, each reel strip of the first plurality of reel strips having a value;
wherein replacing one or more reels of the reel grid with a stack of sticky wild symbols includes:
determining the value of a reel strip for each reel of the reel grid, overwriting a first reel having a higher value reel strip prior to overwriting a second reel having a reel strip value lower than the first reel.

2. The gaming system of claim 1, wherein the instructions further cause the game controller to:
unlock a new game window including a reel grid responsive to unlocking the new level; and
control the display system to display the first unlocked game window and the new game window, wherein subsequent spins include randomly determining, using a random number generator, display symbols for the reels of the first unlocked game window and the new game window except for the reels having stacks of sticky wild symbols.

3. The gaming system of claim 2, wherein:
the new level is a second level;
the new game window is a second game window;
display symbols for the second game window are randomly selected from a second symbol set including a plurality of the special symbols; and
replacing a reel of the reel grid with a stack of sticky wild symbols includes:
replacing one or more reels of the reel grid of the first unlocked game window with the stack of sticky wild symbols; and
replacing one or more reels of the reel grid of the second game window with the stack of sticky wild symbols.

4. The gaming system of claim 3, wherein:
the one or more reels of the first unlocked game window is a second reel of the reel grid of the first unlocked game window, such that the second reel of the first unlocked game window is a stack of sticky wild symbols for all subsequent spins; and
the one or more reels of the second game window is a second reel of the reel grid of the second game window, such that the second reel of the second game window is a stack of sticky wild symbols for all subsequent spins.

5. The gaming system of claim 4, wherein the instructions further cause the game controller to:
unlock a third level responsive to achieving a second predetermine threshold of accumulated special symbols;
unlock a third game window including a reel grid responsive to unlocking the third level;
replace the second reel of the third game window with a stack of sticky wild symbols that remains in the same reel position for all remaining spins; and
for each subsequent spin, randomly determine, using a random number generator, display symbols for the third game window, the display symbols selected from a third symbol set including a plurality of the special symbols.

6. The gaming system of claim 5, wherein the instructions further cause the game controller to:
unlock one or more subsequent levels responsive to achieving one or more subsequent thresholds of accumulated special symbols, wherein the accumulated special symbols are special symbols that land as display symbols of the unlocked game windows over a period of spins;
replace one or more additional reels of one or more of the unlocked game windows with a stack of sticky wild symbols, wherein each stack of sticky wild symbols remains in its reel position for all subsequent spins; and
for each subsequent spin, randomly determine, using a random number generator, display symbols for the reels of the unlocked game windows except for each reel having a stack of sticky wild symbols.

7. The gaming system of claim 6, wherein the first symbol set has a higher RTP than the second or third symbol sets.

8. The gaming system of claim 6, wherein:
the first plurality of reel strips correspond to the reels of the first unlocked game window;
the second symbol set includes a second plurality of reel strips corresponding to the reels of the second game window;
the third symbol set includes a third plurality of reel strips corresponding to the reels of the third game window; and
one or more reel strips of the first plurality of reel strips include more wild symbols than one or more reel strips of the third plurality of reel strips.

9. The gaming system of claim 8, wherein the instructions further cause the game controller to:
prioritize reel strips having more wild symbols when replacing reels with stacks of sticky wild symbols, such that the game controller replaces a reel corresponding to a reel strip that includes more wild symbols with the stack of sticky wild symbols before replacing reels corresponding to reel strips that include fewer wild symbols.

10. The gaming system of claim 1, wherein the instructions further cause the game controller to control the display system to display a special symbol meter to indicate the accumulated special symbols over the period of spins.

11. A gaming system, comprising:
a user interface system configured for receiving an indication to initiate one or more instances of a slot game;
a display system comprising one or more displays; and
a control system comprising one or more processors, wherein the control system executes instructions which cause the control system to perform operations comprising:
receive, via the user interface, an indication to initiate a spin of the instance;
randomly selecting, using a random number generator, display symbols for reels of a first game window, wherein the display symbols are randomly selected from a first set of reel strips, each reel strip of the first set of reel strips corresponding to a reel of the first game window;
tracking, by a special symbol meter, special symbols that land as display symbols over multiple spins of the instance to determine a number of tracked special symbols;
determining whether a new level is unlocked in accordance with a number of accumulated special symbols tracked by the special symbol meter satisfying one or more threshold values;
responsive to the number of tracked special symbols meeting or exceeding one or more threshold values, replacing one or more reels of the first game window with a stack of sticky wild symbols, comprising:
determining the value of a reel strip for each reel of the reel grid, and
overwriting a first reel having a higher value reel strip prior to overwriting
a second reel having a reel strip value lower than the first reel;

responsive to the number of tracked special symbols meeting or exceeding one or more threshold values, unlocking a second game window; and controlling the display system to display the stack of sticky wild symbols in place of the one or more reels for the remaining spins of the instance.

12. The gaming system of claim 11, wherein executing the instructions causes the control system to perform operations further comprising:

using a first reel strip of the first set of reel strips for one reel of the first game window; and using a second reel strip of the first set of reel strips for another reel of the first game window;

wherein the first reel strip has more wild symbols than the second reel strip; and wherein the reel corresponding to the first reel strip is the first reel to be replaced with the stack of sticky wild symbols.

13. The gaming system of claim 12, wherein executing the instructions causes the control system to perform operations further comprising:

using a third reel strip of the first set of reel strips for yet another reel of the first game window;

wherein the second reel strip has more wild symbols than the third reel strip; and wherein the reel corresponding to the second reel strip is second to be replaced with the stack of sticky wild symbols.

14. The gaming system of claim 11, wherein executing the instructions causes the control system to perform operations further comprising:

randomly selecting, using a random number generator, display symbols for reels of the second game window, wherein the display symbols are randomly selected from a second set of reel strips, each reel strip of the second set of reel strips corresponding to a reel of the second game window.

15. The gaming system of claim 14, wherein:

unlocking the second game window includes one or more reels of the second game window replaced with a stack of sticky wild symbols that replaces the one or more reels for remaining spins of the instance; and randomly selecting display symbols for reels of the second game window, includes randomly selecting display symbols for all reels of the second game window except for the one or more reels replaced with a stack of sticky wild symbols.

16. The gaming system of claim 15, wherein:

the second game window includes a stack of sticky wild symbols in a reel position that corresponds to a reel position of a stack of sticky wild symbols in the first game window.

17. The gaming system of claim 11, wherein once the second game window is unlocked, the first game window and the second game window are both in play for remaining spins of the instance.

18. The gaming system of claim 11, wherein executing the instructions causes the control system to perform operations further comprising:

randomly determining, using a random number generator, a total number of possible levels, wherein each level corresponds to a threshold value of the one or more threshold values for tracked symbols.

19. One or more machine-readable devices storing instructions, wherein the instructions when executed by one or more processors, cause performance of operations, comprising:

randomly selecting, using a random number generator, display symbols for each reel of a reel grid of a first unlocked game window, the display symbols for each reel of the reel grid selected from a corresponding reel strip, each reel strip including a plurality of special symbols and having a value;

tracking, by a special symbol meter, accumulated special symbols, wherein accumulated special symbols are special symbols that land as display symbols on the reel grid over a period of spins;

advancing to a first new level responsive to meeting or exceeding a first threshold of accumulated special symbols tracked by the special symbol meter; and responsive to advancing to the first new level, replacing the reel of the reel grid that corresponds to the reel strip with the highest value with a stack of sticky wild symbols that persists in place of the reel for all remaining spins, comprising:

determining the value of a reel strip for each reel of the reel grid, and overwriting a first reel having a higher value reel strip prior to overwriting a second reel having a reel strip value lower than the first reel.

20. The one or more machine-readable devices storing instructions of claim 19, wherein the instructions when executed by one or more processors, cause performance of operations, further comprising:

advancing to a second new level responsive to meeting or exceeding a second threshold of accumulated special symbols; and responsive to advancing to the second new level, unlocking a second game window including a reel grid with one a stack of sticky wild symbols in place of one reel.

* * * * *